(12) United States Patent
Jung et al.

(10) Patent No.: US 10,003,083 B2
(45) Date of Patent: Jun. 19, 2018

(54) COMPOSITION FOR FUEL CELL ELECTRODE

(71) Applicants: LG Fuel Cell Systems, Inc., North Canton, OH (US); University of South Carolina, Columbia, SC (US)

(72) Inventors: Hwa Young Jung, Canton, OH (US); Zhengliang Xing, North Canton, OH (US); Zhien Liu, Canton, OH (US); Richard W. Goettler, Medina, OH (US); Xiao-Dong Zhou, Irmo, SC (US); Emir Dogdibegovic, West Columbia, SC (US)

(73) Assignees: LG Fuel Cell Systems, Inc., North Canton, OH (US); University of South Carolina, Columbia, SC (US)

(*) Notice: Subject to any disclaimer, the term of this patent is extended or adjusted under 35 U.S.C. 154(b) by 138 days.

(21) Appl. No.: 14/805,279

(22) Filed: Jul. 21, 2015

(65) Prior Publication Data
US 2016/0020470 A1 Jan. 21, 2016

Related U.S. Application Data

(60) Provisional application No. 62/027,106, filed on Jul. 21, 2014.

(51) Int. Cl.
*H01M 4/90* (2006.01)
*H01M 8/0236* (2016.01)
(Continued)

(52) U.S. Cl.
CPC ........... *H01M 4/9033* (2013.01); *C04B 35/01* (2013.01); *H01M 8/004* (2013.01); *H01M 8/006* (2013.01);
(Continued)

(58) Field of Classification Search
None
See application file for complete search history.

(56) References Cited

U.S. PATENT DOCUMENTS 4,663,250 A 5/1987 Ong et al.
4,888,254 A 12/1989 Reichner
(Continued)

FOREIGN PATENT DOCUMENTS

CN 101519740 A 9/2009
DE 4422624 A1 1/1996
(Continued)

OTHER PUBLICATIONS

Miyoshi, "Mixed Conductivity and Oxygen Permeability of Doped Pr2NiO4-Based Oxides", Nov. 17, 2006.*
(Continued)

*Primary Examiner* — Barbara L Gilliam
*Assistant Examiner* — Nathanael T Zemui
(74) *Attorney, Agent, or Firm* — Dentons US LLP

(57) ABSTRACT

In some examples, a fuel cell including an anode; electrolyte; and cathode separated from the anode by the electrolyte, wherein the cathode includes a Pr-nickelate based material with $(Pr_{1-x}A_x)_{n+1}(Ni_{1-y}B_y)_nO_{3n+1+\delta}$ as a general formula, where n is 1 as an integer, A is an A-site dopant including of a metal of a group formed by one or more lanthanides, and B is a B-site dopant including of a metal of a group formed by one or more transition metals, wherein the A and B-site dopants are provided such that there is an increase in phase-stability and reduction in degradation of the Pr-nickelate based material, and A is at least one metal cation of lanthanides, La, Nd, Sm, or Gd, B is at least one metal cation of transition metals, Cu, Co, Mn, Zn, or Cr, where: $0 < x < 1$, and $0 < y \leq 0.4$.

20 Claims, 8 Drawing Sheets

(51) Int. Cl.
    *H01M 8/1246*     (2016.01)
    *H01M 8/00*     (2016.01)
    *C04B 35/01*     (2006.01)
    *H01M 8/124*     (2016.01)
    *H01M 8/0217*     (2016.01)
    *H01M 8/1231*     (2016.01)

(52) U.S. Cl.
    CPC ....... H01M 8/0236 (2013.01); H01M 8/1246 (2013.01); *C04B 2235/3213* (2013.01); *C04B 2235/3224* (2013.01); *C04B 2235/3227* (2013.01); *C04B 2235/3241* (2013.01); *C04B 2235/3262* (2013.01); *C04B 2235/3274* (2013.01); *C04B 2235/3275* (2013.01); *C04B 2235/3279* (2013.01); *C04B 2235/3281* (2013.01); *C04B 2235/3284* (2013.01); *C04B 2235/76* (2013.01); *C04B 2235/768* (2013.01); *C04B 2235/80* (2013.01); *H01M 8/0217* (2013.01); *H01M 8/1231* (2016.02); *H01M 2008/1293* (2013.01); *H01M 2300/0071* (2013.01); *H01M 2300/0074* (2013.01); *Y02E 60/525* (2013.01); *Y02P 70/56* (2015.11)

(56) References Cited

U.S. PATENT DOCUMENTS

| | | |
|---|---|---|
| 5,175,061 A | 12/1992 | Hildebrandt et al. |
| 5,273,837 A | 12/1993 | Aitken et al. |
| 5,549,983 A | 8/1996 | Yamanis |
| 5,928,805 A | 7/1999 | Singh et al. |
| 5,942,349 A | 8/1999 | Badwal et al. |
| 6,291,089 B1 | 9/2001 | Piascik et al. |
| 6,344,426 B1 | 2/2002 | Hata et al. |
| 6,558,832 B1 | 5/2003 | Bruck et al. |
| 6,623,881 B2 | 9/2003 | Badding et al. |
| 6,638,658 B1 | 10/2003 | McLean |
| 6,852,436 B2 | 2/2005 | Badding et al. |
| 6,949,307 B2 | 9/2005 | Cable et al. |
| 7,001,684 B2 | 2/2006 | Doshi et al. |
| 7,285,350 B2 | 10/2007 | Keefer et al. |
| 7,323,266 B2 | 1/2008 | Morishima et al. |
| 7,351,449 B2 | 4/2008 | Hunt et al. |
| 7,378,173 B2 | 5/2008 | Badding et al. |
| 7,378,174 B2 | 5/2008 | Hart et al. |
| 7,381,492 B2 | 6/2008 | Chen et al. |
| 7,510,819 B2 | 3/2009 | Chen et al. |
| 7,531,260 B2 | 5/2009 | Day et al. |
| 7,572,532 B2 | 8/2009 | Stevens et al. |
| 7,632,587 B2 | 12/2009 | McLean et al. |
| 7,709,124 B2 | 5/2010 | Barnett et al. |
| 7,718,113 B2 | 5/2010 | Crumm et al. |
| 7,732,002 B2 | 6/2010 | Kodas et al. |
| 7,781,109 B2 | 8/2010 | Gross |
| 7,842,434 B2 | 11/2010 | Rakowski et al. |
| 8,163,434 B2 | 4/2012 | Kebbede et al. |
| 8,455,154 B2 | 6/2013 | Kwon et al. |
| 8,637,209 B2 | 1/2014 | Jacobson et al. |
| 8,828,618 B2 | 9/2014 | Day et al. |
| 9,263,749 B2 | 2/2016 | Takata |
| 2002/0102450 A1 | 8/2002 | Badding et al. |
| 2003/0096147 A1 | 5/2003 | Badding et al. |
| 2004/0023101 A1 | 2/2004 | Jacobson et al. |
| 2004/0028975 A1 | 2/2004 | Badding et al. |
| 2004/0106031 A1 | 6/2004 | Sherman et al. |
| 2004/0166394 A1 | 8/2004 | Sfeir et al. |
| 2004/0180252 A1 | 9/2004 | Wortman |
| 2004/0265669 A1 | 12/2004 | Yoo |
| 2005/0014049 A1 | 1/2005 | Hart et al. |
| 2005/0031518 A1 | 2/2005 | Munakata et al. |
| 2005/0214613 A1 | 9/2005 | Sarkar et al. |
| 2005/0221138 A1 | 10/2005 | Chinchure et al. |
| 2005/0227134 A1 | 10/2005 | Nguyen |
| 2005/0249993 A1 | 11/2005 | Horiuchi et al. |
| 2005/0250004 A1 | 11/2005 | McLean et al. |
| 2006/0016670 A1 | 1/2006 | William et al. |
| 2006/0029860 A1 | 2/2006 | Ketcham et al. |
| 2006/0099442 A1 | 5/2006 | Tietz et al. |
| 2006/0153974 A1 | 7/2006 | Matsuzaki et al. |
| 2006/0166070 A1 | 7/2006 | Hickey et al. |
| 2006/0216575 A1 | 9/2006 | Cassidy |
| 2007/0037031 A1 | 2/2007 | Cassidy et al. |
| 2007/0072070 A1 | 3/2007 | Quek et al. |
| 2007/0087250 A1 | 4/2007 | Lewis et al. |
| 2007/0134537 A1 | 6/2007 | Reisdorf et al. |
| 2007/0184324 A1* | 8/2007 | Lyons ............... C04B 35/48 429/486 |
| 2007/0259242 A1 | 11/2007 | Schaevitz et al. |
| 2008/0124602 A1 | 5/2008 | Larsen et al. |
| 2008/0160376 A1 | 7/2008 | Badding et al. |
| 2008/0199738 A1 | 8/2008 | Perry et al. |
| 2009/0011307 A1 | 1/2009 | Lee et al. |
| 2009/0035635 A1 | 2/2009 | Bae et al. |
| 2009/0078025 A1 | 3/2009 | Singh et al. |
| 2009/0148743 A1 | 6/2009 | Day et al. |
| 2009/0162735 A1 | 6/2009 | Hasegawa |
| 2009/0169958 A1 | 7/2009 | Lin |
| 2010/0035101 A1 | 2/2010 | Maier et al. |
| 2010/0055533 A1 | 3/2010 | Kebbede et al. |
| 2010/0092829 A1 | 4/2010 | Fontaine et al. |
| 2010/0119886 A1 | 5/2010 | Nielsen et al. |
| 2010/0129693 A1 | 5/2010 | Nguyen et al. |
| 2010/0209802 A1 | 8/2010 | Armstrong et al. |
| 2010/0279194 A1 | 11/2010 | Elangovan et al. |
| 2011/0033779 A1 | 2/2011 | Badding et al. |
| 2012/0129068 A1 | 5/2012 | Narendar et al. |
| 2012/0186976 A1 | 7/2012 | Laucournet et al. |
| 2012/0244456 A1 | 9/2012 | Muecke et al. |
| 2012/0258241 A1 | 10/2012 | Tucker et al. |
| 2012/0321981 A1 | 12/2012 | Liu |
| 2012/0321982 A1 | 12/2012 | Liu et al. |
| 2012/0321984 A1 | 12/2012 | Goettler et al. |
| 2012/0321994 A1 | 12/2012 | Liu et al. |
| 2013/0122393 A1 | 5/2013 | Liu et al. |
| 2013/0230644 A1 | 9/2013 | Armstrong |
| 2014/0017596 A1 | 1/2014 | Takata |
| 2014/0272622 A1 | 9/2014 | Xing et al. |

FOREIGN PATENT DOCUMENTS

| | | |
|---|---|---|
| DE | 19627504 C1 | 10/1997 |
| DE | 19932194 A1 | 1/2001 |
| DE | 10050010 A1 | 4/2002 |
| DE | 10306649 A1 | 9/2004 |
| EP | 0532024 A1 | 3/1993 |
| EP | 0876687 B1 | 10/2002 |
| EP | 1230706 B1 | 3/2004 |
| EP | 0815607 B1 | 5/2004 |
| EP | 1596457 A2 | 11/2005 |
| EP | 1624521 A1 | 2/2006 |
| EP | 1472754 B1 | 8/2006 |
| EP | 1768205 A1 | 3/2007 |
| EP | 1850412 A1 | 10/2007 |
| EP | 1852930 A1 | 11/2007 |
| EP | 1304755 A2 | 12/2007 |
| EP | 2276094 A1 | 1/2011 |
| EP | 2462644 A1 | 6/2012 |
| JP | 11-307114 A | 11/1999 |
| JP | 2005-135729 A | 5/2005 |
| JP | 5290870 B2 | 9/2013 |
| JP | 2014186818 | 10/2014 |
| WO | 9957780 A1 | 11/1999 |
| WO | 0229917 A1 | 4/2002 |
| WO | 2003007403 A1 | 1/2003 |
| WO | 03063285 A1 | 7/2003 |
| WO | 2004046627 A2 | 6/2004 |
| WO | 2005122300 A2 | 12/2005 |
| WO | 2006059943 A1 | 6/2006 |
| WO | 2006082057 A2 | 8/2006 |
| WO | 2006082057 A3 | 8/2006 |
| WO | 2008085488 A1 | 7/2008 |
| WO | 2008091801 A2 | 7/2008 |
| WO | 2008103253 A1 | 8/2008 |

(56) References Cited

FOREIGN PATENT DOCUMENTS

| | | |
|---|---|---|
| WO | 2009008979 | 1/2009 |
| WO | 2009085143 A1 | 7/2009 |
| WO | 2012133263 A1 | 10/2012 |
| WO | 2012173990 A1 | 12/2012 |
| WO | 2012173997 A2 | 12/2012 |
| WO | 2012174000 A2 | 12/2012 |
| WO | 2012174002 A2 | 12/2012 |
| WO | 2012174004 A2 | 12/2012 |
| WO | 2014143957 A1 | 9/2014 |

OTHER PUBLICATIONS

Yashima, "Crystal Structure, Diffusion Path, and Oxygen Permeability of a Pr2NiO4-Based Mixed Conductor (Pr0.9La0.1)2(Ni0.74Cu0.21Ga0.05)O4+δ", Feb. 1, 2010.*

Kovalevsky, "Oxygen permeability, stability and electrochemical behavior of Pr2NiO4φd -based materials", Feb. 24, 2007.*

Sadykov, "In situ X-ray diffraction studies of Pr2—xNiO4 +δ crystal structure relaxation caused by oxygen loss", Feb. 18, 2014.*

Mauvy, "Electrode properties of Ln2NiO4+„,Ln =La, Nd, Pr . . . ", Jun. 13, 2006.*

Hendriksen et al., "Development and Durability of SOFC Stacks," RISØ National Laboratory Public Report, Jan. 12, 2004, 31 pp.

Huang et al., "Bi-layer structures as solid oxide fuel cell interconnections," Solid State Ionics, vol. 177, retrieved from www.sciencedirect.com, Apr. 20, 2005, 4 pp.

Hui et al., "Electrical Properties of Yttrium-Doped Strontium Titanate under Reducing Conditions," Journal of the Electrochemical Society, vol. 149, No. 1, Nov. 20, 2001, 10 pp.

Hui et al., "Evaluation of yttrium-doped SrTiO3 as an anode for solid oxide fuel cells," Journal of the European Ceramic Society, vol. 22, (2002), retrieved from www.elsevier.com, Oct. 28, 2001, 9 pp.

Lai et al., "Design Considerations for Segmented-in-Series Fuel Cells," Journal of Power Sources, vol. 147, No. 1-2, Sep. 9, 2005, 10 pp.

Pillai et al., "Short-period Segmented-in-Series Solid Oxide Fuel Cells on Flattened Tube Supports" Journal of Power Sources, vol. 163, No. 2, Jan. 1, 2007, 6 pp.

Marina et al., "Thermal, electrical, and electrocatalytical properties of lanthanum-doped strontium titanate," Solid State Ionics, vol. 149, retrieved from www.elsevier.com, Feb. 28, 2002, 8 pp.

Yi, et al., Fabrication of a MnCo2O4/gadolinia-doped Ceria (GDC) Dual-phase Composite Membrane for Oxygen Separation, Journal of the Korean Ceramic Society, vol. 47, No. 2, pp. 199-204, Feb. 22, 2010.

Fu et al., "LA0.4 SR0.6 Ti1-xMNxOx3-[delta] Perovskites as Anode Materials for Solid Oxide Fuel Cells," Journal of the Electrochemical Society, vol. 153, No. 4, Feb. 2006, 10 pp.

Schuler et al., "Mitigating Cr Contamination by Hot Air Filtering in Solid Oxide Fuel Cells," Electrochemical and Solid-state Letters, vol. 14(12), Nov. 2011, 4 pp.

Weber et al., "The Influence of A-Site-Deficiency on the Performance of Strontium Doped Lanthanum-Manganate Perovskite Type SOFC-Cathodes," Proceedings on the 17th Risoe International Symposium on Materials Science: High Temperature Electrochemistry: Ceramics and Metals, Jan. 1, 1996, 6 pp.

Taniguchi et al., "Suppression of Chromium Diffusion to an SOFC Cathode from an Alloy Separator by a Cathode Second Layer," Denki Kagaku, SANYO Electric Co., Ltd., Feb. 13, 1996, 7 pp.

Kharton et al., "Oxygen ion transport in La2NiO4-based ceramics," Journal of Materials Chemistry, vol. 9, Jul. 15, 1999, 7 pp.

Kovalevsky et al., "Oxygen permeability, stability, and electrochemical behavior of Pr2NiO4+δ-based materials," Journal of Electroceramics, vol. 27, Springer Science + Business Media, Feb. 24, 2007, 14 pp.

Skinner et al., "Oxygen ion Conductors," Materials Today, Elsevier Science Ltd, Mar. 2003, 8 pp.

Choisnet, "Structure and Bonding Anisotropy in Intergrowth Oxides: A Clue to the Manifestation of Bidimensionality in T-, T'-, and T*-Type Structures," Journal of Slid State Chemistry, vol. 147, No. 1, Oct. 1999, pp. 379-389.

Nomura et al., "Electrode properties of doped Pr2NiO4-based oxide cathode for intermediate-temperature SOFCs," Journal of the Ceramic Society of Japan, vol. 120, The Ceramic Society of Japan, Oct. 4, 2012, pp. 534-538.

Ferchaud et al., "High performance praseodymium nickelate oxide cathode for low temperature solid oxide fuel cell," Journal of Power Sources, vol. 196, ScienceDirect, Sep. 22, 2010, pp. 1872-1879.

Kovalevsky et al., "Stability and oxygen transport properties of Pr2NiO4+δ ceramics," Journal of the European Ceramic Society, vol. 27, ScienceDirect, Mar. 28, 2007, pp. 4269-4272.

Mauvy et al., "Oxygen electrode reaction on Nd2NiO4+δ cathode materials: impedance spectroscopy study," Solid State Ionics, vol. 158, ScienceDirect, Elsevier, Jul. 25, 2002, pp. 17-28.

Kharton et al., "Ionic transport in oxygen-hyperstoichiometric phases with K2NiF4-type structure," Solid State Ionics, vol. 143, Elsevier, Jul. 2001, pp. 337-353.

Lou et al., "Preparation and Electrochemical Characterization of Ruddlesden-Popper Oxide La4Ni3O10 Cathode for IT-SOFCs by Sol-gel Method," Journal of Solid State Electrochemistry, vol. 17, No. 10, Jul. 11, 2013, pp. 2703-2709.

Solis et al., "Study of Pr and Pr and Co Doped La2NiO4+δ as Cathodes for La5.5WO11.25-δ Based Protonic Conducting Fuel Cells," Journal of Power Sources, Elsevier, vol. 240, May 21, 2013, pp 691-697.

Wei et al., "Enhancement of Oxygen Permeation Through U-Shaped K2NiF4-Type Oxide Hollow Fiber Membranes by Surface Modifications," Separation and Purification Technology, Elsevier, vol. 110, Mar. 14, 2013, pp. 74-80.

International Preliminary Report on Patentability and Written Opinion from International Application No. PCT/US2015/041392, dated Feb. 2, 2017, 13 pp.

Ramasamy et al., "Enhancing Electrochemical Performance by Control of Transport Properties in Buffer Layers—Solid Oxide Fuel/Electrolyser Cells," Phys. Chem. Chem. Phys., Royal Society of Chemistry, vol. 17, Apr. 2, 2015, pp. 11527-11539.

Zhu et al., "Preparation and Properties for Solid Solution Ce0.8Pr0.2-xNdxO2-δ (x=0.02, 0.05, 0.1)," Advanced Materials Research, vols. 1065-1069, Dec. 11, 2014, pp. 1921-1925.

Response to Communication Pursuant to Rules 161(1) and 162 EPC dated Feb. 28, 2017 from counterpart European Application No. 15745070.1, filed Sep. 6, 2017, 10 pp.

* cited by examiner

US 10,003,083 B2

COMPOSITION FOR FUEL CELL ELECTRODE

RELATED APPLICATIONS

This application claims the benefit of U.S. Provisional Application No. 62/027,106, titled, "COMPOSITION FOR FUEL CELL ELECTRODE," filed Jul. 21, 2014, the entire content of which is incorporated herein by reference.

GOVERNMENT LICENSE RIGHTS STATEMENT

This invention was made with Government support under Assistance Agreement No. DE-FE0000303 awarded by Department of Energy. The Government has certain rights in this invention.

TECHNICAL FIELD

The disclosure generally relates to fuel cells, such as solid oxide fuel cells.

BACKGROUND

Fuel cells, fuel cell systems and interconnects for fuel cells and fuel cell systems remain an area of interest. Some existing systems have various shortcomings, drawbacks, and disadvantages relative to certain applications. Accordingly, there remains a need for further contributions in this area of technology.

SUMMARY

Example compositions for cathodes of fuels cells, such as, e.g., solid oxide fuels cells, are described. For example, a Pr-nickelate oxide material for electrochemical cell electrodes with, e.g., high performance and phase stability at temperature above 750° C. through doping foreign elements into $Pr_2NiO_{4+\delta}$, at the Pr-site (A-site) and/or the Ni-site (B-site), are described.

In one example, the disclosure is directed to fuel cell comprising an anode; an electrolyte; and a cathode separated from the anode by the electrolyte, wherein the cathode includes a Pr-nickelate based material with $(Pr_{1-x}A_x)_{n+1}(Ni_{1-y}B_y)_nO_{3n+1+\delta}$ as a general formula, where n is 1 as an integer, A is an A-site dopant comprising of a metal of a group formed by one or more lanthanides, and B is a B-site dopant comprising of a metal of a group formed by one or more transition metals, wherein the A-site dopant and B-site dopant are provided such that there is an increase in phase-stability and reduction in degradation of the Pr-nickelate based material, and A is at least one metal cation of lanthanides, La, Nd, Sm, or Gd, B is at least one metal cation of transition metals, Cu, Co, Mn, Zn, or Cr, where: $0<x<1$, and $0<y\le0.4$; and wherein the anode, cathode, and electrolyte are configured to form an electrochemical cell.

In another example, the disclosure is directed to fuel cell comprising an anode; an electrolyte; and a cathode separated from the anode by the electrolyte, wherein the cathode includes a Pr-nickelate based material with $(Pr_{1-x}A_x)_{n+1\pm z}(Ni_{1-y}B_y)_nO_{3n+1+\delta}$ as a general formula, where n is 1 as an integer, A is an A-site dopant comprising of a metal of a group formed by one or more lanthanides, and B is a B-site dopant comprising of a metal of a group formed by one or more transition metals, wherein A is at least one metal cation of lanthanides, La, Nd, Sm, or Gd, B is at least one metal cation of transition metals, Cu, Co, Mn, Zn, Fe, or Cr, where: $0<x<1$, $0<y\le0.4$, and $0<z\le0.1$; and wherein the anode, cathode, and electrolyte are configured to form an electrochemical cell.

In another example, the disclosure is directed to a fuel cell comprising an anode; an electrolyte; and a cathode separated from the anode by the electrolyte, wherein the cathode includes a Pr-nickelate based material with $(Pr_{1-x}A_x)_{n+1\pm z}(Ni_{1-y}B_y)_nO_{3n+1+\delta}$ as a general formula, where n is 2 or 3 as an integer, A is an A-site dopant comprising of a metal of a group formed by one or more lanthanides, and B is a B-site dopant comprising of a metal of a group formed by one or more transition metals, wherein A is at least one metal cation of lanthanides, La, Nd, Sm, or Gd, B is at least one metal cation of transition metals, Cu, Co, Mn, Zn, Fe, or Cr, where: $0<x<1$, $0\le y\le0.4$, and $0\le z\le0.1$; and wherein the anode, cathode, and electrolyte are configured to form an electrochemical cell.

In another example, the disclosure is directed to a fuel cell comprising an anode; an electrolyte; and a cathode separated from the anode by the electrolyte, wherein the cathode includes a Pr-nickelate based material with $(Pr_{1-x-w}A_xA'_w)_{n+1\pm z}(Ni_{1-y}B_y)_nO_{3n+1+\delta}$ as a general formula, where n is 1 to 3 as an integer, A and A' are an A-site dopant comprising of a metal of a group formed by one or more lanthanides and transition metals, and B is a B-site dopant comprising of a metal of a group formed by one or more transition metals, wherein A is at least one metal cation of lanthanides, La, Nd, Sm, or Gd, A' is at least one metal cation of transition metals, Sr, or Ca, B is at least one metal cation of transition metals, Cu, Co, Mn, Zn, Fe, or Cr, where: $0<x<1$, $0<w<1$, $0<x+w<1$, $0\le y\le0.4$, and $0\le z\le0.1$; and wherein the anode, cathode, and electrolyte are configured to form an electrochemical cell.

In another example, the disclosure is directed to a fuel cell comprising an anode; an electrolyte; and a cathode separated from the anode by the electrolyte, wherein the cathode includes at least one of a $(Pr_{1-x}A_x)_{n+1}(Ni_{1-y}B_y)_nO_{3n+1+\delta}$ material or $(Pr_{1-x-w}A_xA'_w)_{n+1\pm z}(Ni_{1-y}B_y)_nO_{3n+1+\delta}$ material, where A is an A-site dopant and B is a B-site dopant, wherein the A-site dopant and B-site dopant are provided such that there is an increase in phase-stability and reduction in degradation of the at least one of the $(Pr_{1-x}A_x)_{n+1}(Ni_{1-y}B_y)_nO_{3n+1+\delta}$ material or $(Pr_{1-x-w}A_xA'_w)_{n+1\pm z}(Ni_{1-y}B_y)_nO_{3n+1+\delta}$ material, and wherein the anode, cathode, and electrolyte are configured to form an electrochemical cell.

In another example, the disclosure is directed to a method comprising forming a fuel cell, the fuel cell including a cathode according any of the cathodes described herein.

In another example, the disclosure is directed to a method of operating the fuel cell of any of the fuel cells described herein, the method comprising operating the fuel cell at a desired temperature. In some examples, the desired temperature is greater than approximately 700 degrees Celsius.

In another examples, the disclosure is directed to a method comprising generating electricity via an electrochemical reaction using any of the example fuel cells described herein.

In another example, the disclosure is directed to an electrode comprising any of the Pr-nickelate based materials described herein.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

The description herein makes reference to the accompanying drawings wherein like reference numerals refer to like parts throughout the several views.

Figure 1:
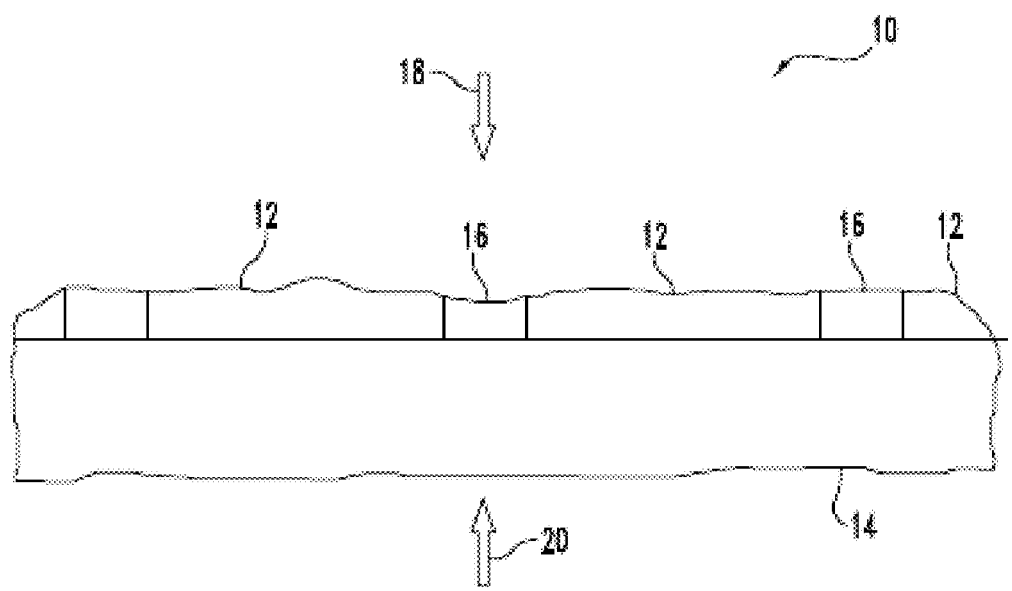
FIG. 1 is a schematic diagram illustrating an example fuel cell system in accordance with an embodiment of the present disclosure.

Referring to the drawings, some aspects of a non-limiting example of a fuel cell system in accordance with an embodiment of the present disclosure is schematically depicted. In the drawing, various features, components and interrelationships therebetween of aspects of an embodiment of the present disclosure are depicted. However, the present disclosure is not limited to the particular embodiments presented and the components, features and interrelationships therebetween as are illustrated in the drawings and described herein.

DETAILED DESCRIPTION

As described above, examples of the present disclosure relate to example compositions for cathodes of fuels cells, such as, e.g., solid oxide fuels cells. Anode, electrolyte, and cathode are three major components of an electrochemical cell such as a fuel cell converts chemical energy into electrical energy. Oxide materials have been developed for a cathode or electrodes (anode and cathode) of electrochemical cell, especially solid oxide fuel cells (SOFCs). In SOFCs, it may be desirable to develop new cathode materials because, e.g., the cathode resistance may limit the performance and the long-term durability of SOFCs.

Ni-based layered perovskite compounds with the Ruddlesden-Popper (R-P), or $K_2NiF_4$-type structure, $Ln_2NiO_{4+\delta}$ (Ln=La, Nd, Pr, Sm, etc.), may be example cathode materials, e.g., because of their high mixed ionic and electronic conducting (MIEC) properties. In some examples, $Ln_2NiO_{4+\delta}$ cathodes may exhibit lower polarization resistance than other cathode materials like LSM. Among the nickelates, $Pr_2NiO_{4+\delta}$ may exhibit faster oxygen exchange and diffusion coefficients than LSM, LSCF, and other cathode candidates. Because of this, $Pr_2NiO_{4+\delta}$ may exhibit the relatively low polarization resistance among nickelates and may be the most suitable for SOFC cathodes. However, in some examples, nickelate has phase instability issues such as, e.g., ex-solution of $PrO_x$ and/or NiO during operating at temperature above 800 degrees Celsius (C) or processing in oxidizing atmospheres. Additionally, because the phase instability and microstructure changes induced by more oxidizable phases, $Pr_2NiO_{4+\delta}$ may exhibit high degradation rate during long-term durability testing.

In accordance with one or more examples of the disclosure, example Pr-nickelate materials for electrochemical cell electrodes (e.g., cathodes) with high performance and phase stability at temperature above, e.g., about 750 degrees C. through doping various elements into $Pr_2NiO_{4+\delta}$, at the Pr-site (A-site) and/or the Ni-site (B-site) are described. In some examples, the oxide materials may be composed of $Pr_2NiO_4$-based oxides of general formula (1) $(Pr_{1-x}A_x)_2Ni_{1-y}B_yO_{4+\delta}$, wherein A (A-site) is a metal cation of a group formed by lanthanides, and B (B-site) is a metal of a group formed by transition metals said material being such that 0<x<1; 0<y<0.4; and 0<δ<0.3. Examples of the disclosure are also directed to an electrode including the oxide material and a device in the form of a fuel cell provided with at least one electrochemical cell comprising the electrode including the oxide material.

In perovskite materials, the effects of A-site and B-site dopant, at least small amount, may improve electro-catalytic properties and oxygen permeation properties. Unlike LSM perovskite oxide, nickelate is a mixed electronic and ionic conductor, and transports oxygen ions through oxygen interstitials. As such, $Pr_2NiO_4$-based oxides may have lower activation energy for polarization resistance versus temperature than LSM.

Examples of the disclosure may provide for one or more advantages. In some examples, when used to form an electrode, doping of foreign elements into $Pr_2NiO_{4+\delta}$, at the Pr-site (A-site) and/or the Ni-site (B-site) may improve the electrode performance due to the mixed ionic/electronic conducting (MIEC) properties of the material. As another example, in some examples, when used to form an electrode, doping of foreign elements into $Pr_2NiO_{4+\delta}$, at the Pr-site (A-site) and/or the Ni-site (B-site) may improve the electrode polarization, especially at lower operating temperatures, e.g., due to its relatively low activation energy. As another example, in some examples, with improved electrode performance, especially at lower temperatures, through the doping of foreign elements into $Pr_2NiO_{4+\delta}$, at the Pr-site (A-site) and/or the Ni-site (B-site), a fuel cell device including such an electrode material may be operated at lower temperature range for improved long term durability and cost reduction. Examples of the disclosure may provide for additional advantage, such as, e.g., those apparent from the description herein.

FIG. 1 is a schematic diagram illustrating an example fuel cell system 10 in accordance with an embodiment of the present disclosure. As shown in FIG. 1, fuel cell system 10 includes a plurality of electrochemical cells 12 (or "individual fuel cells") formed on substrate 14. Electrochemical cells 12 are coupled together in series by interconnect 16. Fuel cell system 10 is a segmented-in-series arrangement deposited on a flat porous ceramic tube, although it will be understood that the present disclosure is equally applicable to segmented-in-series arrangements on other substrates, such on a circular porous ceramic tube. In various embodiments, fuel cell system 10 may be an integrated planar fuel cell system or a tubular fuel cell system.

Each electrochemical cell 12 includes an oxidant side 18 and a fuel side 20. The oxidant is generally air, but could also be pure oxygen ($O_2$) or other oxidants, e.g., including dilute air for fuel cell systems having air recycle loops, and may be supplied to electrochemical cells 12 from oxidant side 18. Substrate 14 may be specifically engineered porosity, e.g., the porous ceramic material is stable at fuel cell operation conditions and chemically compatible with other fuel cell materials. In other embodiments, substrate 14 may be a surface-modified material, e.g., a porous ceramic material having a coating or other surface modification, e.g., configured to prevent or reduce interaction between electrochemical cell 12 layers and substrate 14. A fuel, such as a reformed hydrocarbon fuel, e.g., synthesis gas, is supplied to electrochemical cells 12 from fuel side 20 via channels (not shown) in porous substrate 14. Although air and synthesis gas reformed from a hydrocarbon fuel may be employed in some examples, it will be understood that electrochemical cells using other oxidants and fuels may be employed without departing from the scope of the present disclosure, e.g., pure hydrogen and pure oxygen. In addition, although fuel is supplied to electrochemical cells 12 via substrate 14, it will be understood that in other embodiments, the oxidant may be supplied to the electrochemical cells via a porous substrate.

Figure 2:
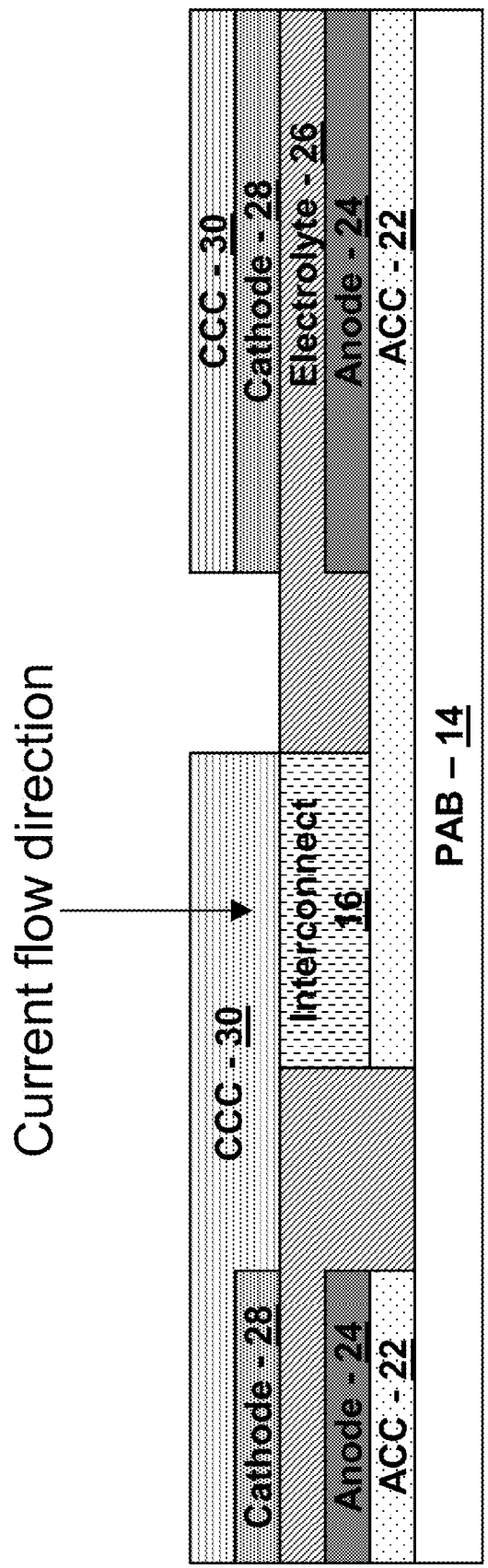
FIG. 2 is a schematic diagram illustrating an example cross section of a fuel cell system in accordance with an embodiment of the present disclosure.

FIG. 2 is a schematic diagram illustrating an example cross section of fuel cell system 10 in accordance with an embodiment of the present disclosure. Fuel cell system 10 may be formed of a plurality of layers screen printed onto substrate (or porous anode barrier layer) 14. This may include a process whereby a woven mesh has openings through which the fuel cell layers are deposited onto substrate 14. The openings of the screen determine the length and width of the printed layers. Screen mesh, wire diameter, ink solids loading and ink rheology may determine the thickness of the printed layers. Fuel cell system 10 layers include an anode conductive layer 22, an anode layer 24, an electrolyte layer 26, a cathode layer 28 and a cathode conductive layer 30. In one form, electrolyte layer 26 may be a single layer or may be formed of any number of sub-layers. It will be understood that FIG. 2 is not necessarily to scale. For example, vertical dimensions are exaggerated for purposes of clarity of illustration.

In each electrochemical cell 12, anode conductive layer 22 conducts free electrons away from anode 24 and conducts the electrons to cathode conductive layer 30 via interconnect 16. Cathode conductive layer 30 conducts the electrons to cathode 28. Interconnect 16 is electrically coupled to anode conductive layer 22 and to cathode conductive layer 30.

Interconnects 16 for solid oxide fuel cells (SOFC) are preferably electrically conductive in order to transport electrons from one electrochemical cell to another; mechanically and chemically stable under both oxidizing and reducing environments during fuel cell operation; and nonporous, in order to prevent diffusion of the fuel and/or oxidant through the interconnect. If the interconnect is porous, fuel may diffuse to the oxidant side and burn, resulting in local hot spots that may result in a reduction of fuel cell life, e.g., due to degradation of materials and mechanical failure, as well as reduced efficiency of the fuel cell system. Similarly, the oxidant may diffuse to the fuel side, resulting in burning of the fuel. Severe interconnect leakage may significantly reduce the fuel utilization and performance of the fuel cell, or cause catastrophic failure of fuel cells or stacks.

Interconnect 16 may be formed of a precious metal including Ag, Pd, Au and/or Pt and/or alloys thereof, although other materials may be employed without departing from the scope of the present disclosure. For example, in other embodiments, it is alternatively contemplated that other materials may be employed, including precious metal alloys, such as Ag—Pd, Ag—Au, Ag—Pt, Au—Pd, Au—Pt, Pt—Pd, Ag—Au—Pd, Ag—Au—Pt, Ag—Au—Pd—Pt and/or binary, ternary, quaternary alloys in the Pt—Pd—Au—Ag family, inclusive of alloys having minor non-precious metal additions, cermets composed of a precious metal, precious metal alloy, and an inert ceramic phase, such as alumina, or ceramic phase with minimum ionic conductivity which will not create significant parasitics, such as YSZ (yttria stabilized zirconia, also known as yttria doped zirconia, yttria doping is 3-8 mol %, preferably 3-5 mol %), ScSZ (scandia stabilized zirconia, scandia doping is 4-10 mol %, preferably 4-6 mol %), doped ceria, and/or conductive ceramics, such as conductive perovskites with A or B-site substitutions or doping to achieve adequate phase stability and/or sufficient conductivity as an interconnect, e.g., including at least one of doped strontium titanate (such as $La_xSr_{1-x}TiO_{3-\delta}$, x=0.1 to 0.3), LSCM ($La_{1-x}Sr_xCr_{1-y}Mn_yO_3$, x=0.1 to 0.3 and y=0.25 to 0.75), doped yttrium chromites (such as $Y_{1-x}Ca_xCrO_{3-\delta}$, x=0.1-0.3) and/or other doped lanthanum chromites (such as $La_{1-x}Ca_xCrO_{3-\delta}$, where x=0.15-0.3), and conductive ceramics, such as doped strontium titanate, doped yttrium chromites, LSCM ($La_{1-x}Sr_xCr_{1-y}Mn_yO_3$), and other doped lanthanum chromites. In one example, interconnect 16 may be formed of y(PdxPt1-x)-(1-y)YSZ. Where x is from 0 to 1 in weight ratio, preferably x is in the range of 0 to 0.5 for lower hydrogen flux. Y is from 0.35 to 0.80 in volume ratio, preferably y is in the range of 0.4 to 0.6.

Anode conductive layer 22 may be an electrode conductive layer formed of a nickel cermet, such as such as Ni—YSZ (e.g., where yttria doping in zirconia is 3-8 mol %), Ni—ScSZ (e.g., where scandia doping is 4-10 mol %, preferably including a second doping for example 1 mol % ceria for phase stability for 10 mol % scandia-$ZrO_2$) and/or Ni-doped ceria (such as Gd or Sm doping), doped lanthanum chromite (such as Ca doping on A site and Zn doping on B site), doped strontium titanate (such as La doping on A site and Mn doping on B site), $La_{1-x}Sr_xMn_yCr_{1-y}O_3$ and/or Mn-based R-P phases of the general formula a $(La_{1-x}Sr_x)_{n+1}Mn_nO_{3n+1}$ Alternatively, it is considered that other materials for anode conductive layer 22 may be employed such as cermets based in part or whole on precious metal. Precious metals in the cermet may include, for example, Pt, Pd, Au, Ag, and/or alloys thereof. The ceramic phase may include, for example, an inactive non-electrically conductive phase, including, for example, YSZ, ScSZ and/or one or more other inactive phases, e.g., having desired coefficients of thermal expansion (CTE) in order to control the CTE of the layer to match the CTE of the substrate and electrolyte. In some embodiments, the ceramic phase may include $Al_2O_3$ and/or a spinel such as $NiAl_2O_4$, $MgAl_2O_4$, $MgCr_2O_4$, and $NiCr_2O_4$. In other embodiments, the ceramic phase may be electrically conductive, e.g., doped lanthanum chromite, doped strontium titanate and/or one or more forms of LaSrMnCrO and/or R-P phases of the general formula $(La_{1-x}Sr_x)_{n+1}Mn_nO_{3n+1}$ Electrolyte layer 26 may be made from a ceramic material. In one form, a proton and/or oxygen ion conducting ceramic, may be employed. In one form, electrolyte layer 26 is formed of YSZ, such as 3YSZ and/or 8YSZ. In other embodiments, electrolyte layer 26 may be formed of ScSZ, such as 4ScSZ, 6ScSz and/or 10Sc1CeSZ in addition to or in place of YSZ. In other embodiments, other materials may be employed. For example, it is alternatively considered that electrolyte layer 26 may be made of doped ceria and/or doped lanthanum gallate. In any event, electrolyte layer 26 is substantially impervious to diffusion there through of the fluids used by fuel cell 10, e.g., synthesis gas or pure hydrogen as fuel, as well as, e.g., air or O2 as an oxidant, but allows diffusion of oxygen ions or protons.

Cathode conductive layer 30 may be an electrode conductive layer formed of a conductive ceramic, for example, at least one of $LaNi_xFe_{1-x}O_3$ (such as, e.g., $LaNi_{0.6}Fe_{0.4}O_3$), $La_{1-x}Sr_xMnO_3$ (such as $La_{0.75}Sr_{0.25}MnO_3$), $La_{1-x}Sr_xCoO_3$ and/or $Pr_{1-x}Sr_xCoO_3$, such as $Pr_{0.8}Sr_{0.2}CoO_3$. In other embodiments, cathode conductive layer 30 may be formed of other materials, e.g., a precious metal cermet, although other materials may be employed without departing from the scope of the present invention. The precious metals in the precious metal cermet may include, for example, Pt, Pd, Au, Ag and/or alloys thereof. The ceramic phase may include, for example, YSZ, ScSZ and $Al_2O_3$, or other non-conductive ceramic materials as desired to control thermal expansion.

Any suitable technique may be employed to form electrochemical cell 12 of FIGS. 1 and 2. In the example of FIG.

2, anode conductive layer 22 may be printed directly onto substrate 14, as is a portion of electrolyte 26. Anode layer 24 may be printed onto anode conductive layer 22. Portions of electrolyte layer 26 may be printed onto anode layer 24, and portions of electrolyte layer 26 are printed onto anode conductive layer 22 and onto substrate 14. Cathode layer 28 is printed on top of electrolyte layer 26. Portions of cathode conductive layer 30 are printed onto cathode layer 28 and onto electrolyte layer 26. Cathode layer 28 is spaced apart from anode layer 24 the local thickness of electrolyte layer 26.

Anode layer 24 includes anode gaps separate anode layer 24 into a plurality of individual anodes, one for each electrochemical cell 12. Similarly, cathode layer 28 includes gaps that separate cathode layer 28 into a corresponding plurality of individual cathodes, one for each electrochemical cell 12. Each individual anode and the corresponding cathode that is spaced apart with the portion of electrolyte layer 26 disposed there between to form an electrochemical cell 12.

Similarly, anode conductive layer 22 and cathode conductive layer 30 have respective gaps separating anode conductive layer 22 and cathode conductive layer 30 into a plurality of respective anode conductor films and cathode conductor films. The terms, "anode conductive layer" and "anode conductor film" may be used interchangeably, in as much as the latter is formed from one or more layers of the former; and the terms, "cathode conductive layer" and "cathode conductor film" may be used interchangeably, in as much as the latter is formed from one or more layers of the former.

In some examples, anode conductive layer 22 has a thickness of approximately 5-15 microns, although other values may be employed without departing from the scope of the present disclosure. For example, it is considered that in other embodiments, the anode conductive layer may have a thickness in the range of approximately 5-50 microns. In yet other embodiments, different thicknesses may be used, e.g., depending upon the particular material and application.

Similarly, anode layer 24 may have a thickness of approximately 5-20 microns, although other values may be employed without departing from the scope of the present invention. For example, it is considered that in other embodiments, the anode layer may have a thickness in the range of approximately 5-40 microns. In yet other embodiments, different thicknesses may be used, e.g., depending upon the particular anode material and application.

Electrolyte layer 26 may have a thickness of approximately 5-15 microns with individual sub-layer thicknesses of approximately 5 microns minimum, although other thickness values may be employed without departing from the scope of the present invention. For example, it is considered that in other embodiments, the electrolyte layer may have a thickness in the range of approximately 5-200 microns. In yet other embodiments, different thicknesses may be used, e.g., depending upon the particular materials and application.

Cathode layer 28 may have a thickness of approximately 3-30 microns, such as, e.g., approximately 5-10 microns, although other values may be employed without departing from the scope of the present invention. For example, it is considered that in other embodiments, the cathode layer may have a thickness in the range of approximately 10-50 microns. In yet other embodiments, different thicknesses may be used, e.g., depending upon the particular cathode material and application.

Cathode conductive layer 30 has a thickness of approximately 5-100 microns, although other values may be employed without departing from the scope of the present invention. For example, it is considered that in other embodiments, the cathode conductive layer may have a thickness less than or greater than the range of approximately 5-100 microns. In yet other embodiments, different thicknesses may be used, e.g., depending upon the particular cathode conductive layer material and application.

Although not shown in FIG. 2, in some examples, fuel cell system 10 may include one or more chemical barrier layers between interconnect 16 and adjacent components to reduce or prevent diffusion between the interconnect and adjacent components, e.g., an anode and/or an anode conductor film and/or cathode and/or cathode conductor film, may adversely affect the performance of certain fuel cell systems. In various embodiments, such a chemical barrier layer may be configured to prevent or reduce material migration or diffusion at the interface between the interconnect and an anode, and/or between the interconnect and an anode conductor film, and/or between the interconnect and a cathode, and/or between the interconnect and a cathode conductor film which may improve the long term durability of the interconnect. For example, without a chemical barrier, material migration (diffusion) may take place at the interface between an interconnect formed of a precious metal cermet, and an anode conductor film and/or anode formed of a Ni-based cermet. The material migration may take place in both directions, e.g., Ni migrating from the anode conductive layer/conductor film and/or anode into the interconnect, and precious metal migrating from the interconnect into the conductive layer/conductor film and/or anode. The material migration may result in increased porosity at or near the interface between the interconnect and the anode conductor film and/or anode, and may result in the enrichment of one or more non or low-electronic conducting phases at the interface, yielding a higher area specific resistance (ASR), and hence resulting in reduced fuel cell performance. Material migration between the interconnect and the cathode and/or between the interconnect and the cathode conductor film may also or alternatively result in deleterious effects on fuel cell performance. Such a chemical barrier layer may be formed of one or both of two classes of materials; cermet and/or conductive ceramic.

In accordance with examples of the disclosure, cathode layer 28 may be formed of a Pr-nickelate based material (e.g., $Pr_2NiO_{4+\delta}$) doped at the Pr-site (A-site) and/or the Ni-site (B-site). The A-site and/or B-site doping may improve one or more properties of the Pr-nickelate, such as, e.g., increased phase stability and reduced degradation of cathode layer 28 in a high temperature operating environment.

In one example, cathode 28 includes a Pr-nickelate based material with $(Pr_{1-x}A_x)_{n+1}(Ni_{1-y}B_y)_nO_{3n+1+\delta}$ as a general formula, where n is 1 as an integer, A is an A-site dopant comprising of a metal of a group formed by one or more lanthanides, and B is a B-site dopant comprising of a metal of a group formed by one or more transition metals, wherein the A-site dopant and B-site dopant are provided such that there is an increase in phase-stability and reduction in degradation of the Pr-nickelate based material. For the material, A may be at least one metal cation of lanthanides, La, Nd, Sm, or Gd, B is at least one metal cation of transition metals, Cu, Co, Mn, Zn, or Cr, $0<x<1$, and $0<y\leq0.4$. In some examples, $0.25\leq x\leq0.75$, and $0<y\leq0.2$. In some examples, A is Nd, and B is Cu. The $(Pr_{1-x}A_x)_{n+1}(Ni_{1-y}B_y)_nO_{3n+1+\delta}$ material may exhibit a Ruddlesden-Popper or $K_2NiF_4$ phase constitution.

In another example, cathode 28 includes a Pr-nickelate based material with $(Pr_{1-x}A_x)_{n+1\pm z}(Ni_{1-y}B_y)_nO_{3n+1+\delta}$ as a general formula, where n is 1 as an integer, A is an A-site dopant comprising of a metal of a group formed by one or more lanthanides, and B is a B-site dopant comprising of a metal of a group formed by one or more transition metals. For the material, A may be at least one metal cation of lanthanides, La, Nd, Sm, or Gd, B is at least one metal cation of transition metals, Cu, Co, Mn, Zn, or Cr, $0<x<1$, $0<y\leq0.4$, and $0<z\leq0.1$. In some examples, $0.25\leq x\leq0.75$, $0<y\leq0.2$, and $0<z\leq0.05$. In some examples, A is Nd, and B is Cu. The $(Pr_{1-x}A_x)_{n+1\pm z}(Ni_{1-y}B_y)_nO_{3n+1+\delta}$ material may exhibit a Ruddlesden-Popper or $K_2NiF_4$ phase constitution.

In another example, cathode 28 includes a Pr-nickelate based material with $(Pr_{1-x}A_x)_{n+1\pm z}(Ni_{1-y}B_y)_nO_{3n+1+\delta}$ as a general formula, where n is 2 or 3 as an integer, A is an A-site dopant comprising of a metal of a group formed by one or more lanthanides, and B is a B-site dopant comprising of a metal of a group formed by one or more transition metals. For the material, A may be at least one metal cation of lanthanides, La, Nd, Sm, or Gd, B is at least one metal cation of transition metals, Cu, Co, Mn, Zn, or Cr, $0<x<1$, $0<y\leq0.4$, and $0<z\leq0.1$. In some examples, $0.25\leq x\leq0.75$, $0<y\leq0.2$, and $0<z\leq0.05$. In some examples, A is Nd, and B is Cu. The $(Pr_{1-x}A_x)_{n+1\pm z}(Ni_{1-y}B_y)_nO_{3n+1+\delta}$ material may exhibit a Ruddlesden-Popper or $K_2NiF_4$ phase constitution.

In another example, cathode 28 includes a Pr-nickelate based material with $(Pr_{1-x-w}A_xA'_w)_{n+1\pm z}(Ni_{1-y}B_y)_nO_{3n+1+\delta}$ as a general formula, where n is 1 to 3 as an integer, A and A' are an A-site dopant comprising of a metal of a group formed by one or more lanthanides and transition metals, and B is a B-site dopant comprising of a metal of a group formed by one or more transition metals. For the material, A is at least one metal cation of lanthanides, La, Nd, Sm, or Gd, A' is at least one metal cation of transition metals, Sr, or Ca, B is at least one metal cation of transition metals, Cu, Co, Mn, Zn, Fe, or Cr, $0<x<1$, $0<w<1$, $0<x+w<1$, $0\leq y\leq0.4$, and $0\leq z\leq0.1$. The $(Pr_{1-x-w}A_xA'_w)_{n+1\pm z}(Ni_{1-y}B_y)_nO_{3n+1+\delta}$ materiel may exhibit a Ruddlesden-Popper or $K_2NiF_4$ phase constitution.

Pr-nickelate based materials with A-site and/or B-site doping may allow for increased performance during high temperature fuel cell operation. In some examples, fuel cells include cathode 28 may operate at a temperature greater than approximately 700 degrees Celsius, such as, e.g., greater than approximately 750 degrees Celsius or greater than approximately 800 degrees Celsius. At such operating temperatures, cathode 28 may exhibit relatively high phase stability and durability, e.g., as compared to an undoped Pr-nickelate materials.

Components other than that of cathode 28 in fuel cell system 10 may have compositions suitable for use with cathode 28, e.g., when formed of one or more of the example Pr-nickelate based materials with A-site and/or B-site doping described herein. For example, cathode current conductor 30 may be formed of a conductive ceramic which is chemically compatible to Pr-nickelate cathode, such as, e.g., lanthanum nickel ferrite ($La(NiFe)O_{3-\delta}$) and/or lanthanum strontium cobaltite ($(LaSr)CoO_{3-\delta}$) with a perovskite structure. Although not shown FIG. 2, system 10 may include a ceria-based barrier layer between cathode 28 and electrolyte 26. Additionally or alternatively, cathode 28 may be formed of a composite material including a mixture of the example nickelate materials described herein and ionic ceria phase, e.g., in a manner that improves microstructure stability.

EXAMPLES

Various experiments were carried out to evaluate one or more aspects of example cathode compositions in accordance with the disclosure. However, examples of the disclosure are not limited to the experimental anode compositions.

Figure 3:
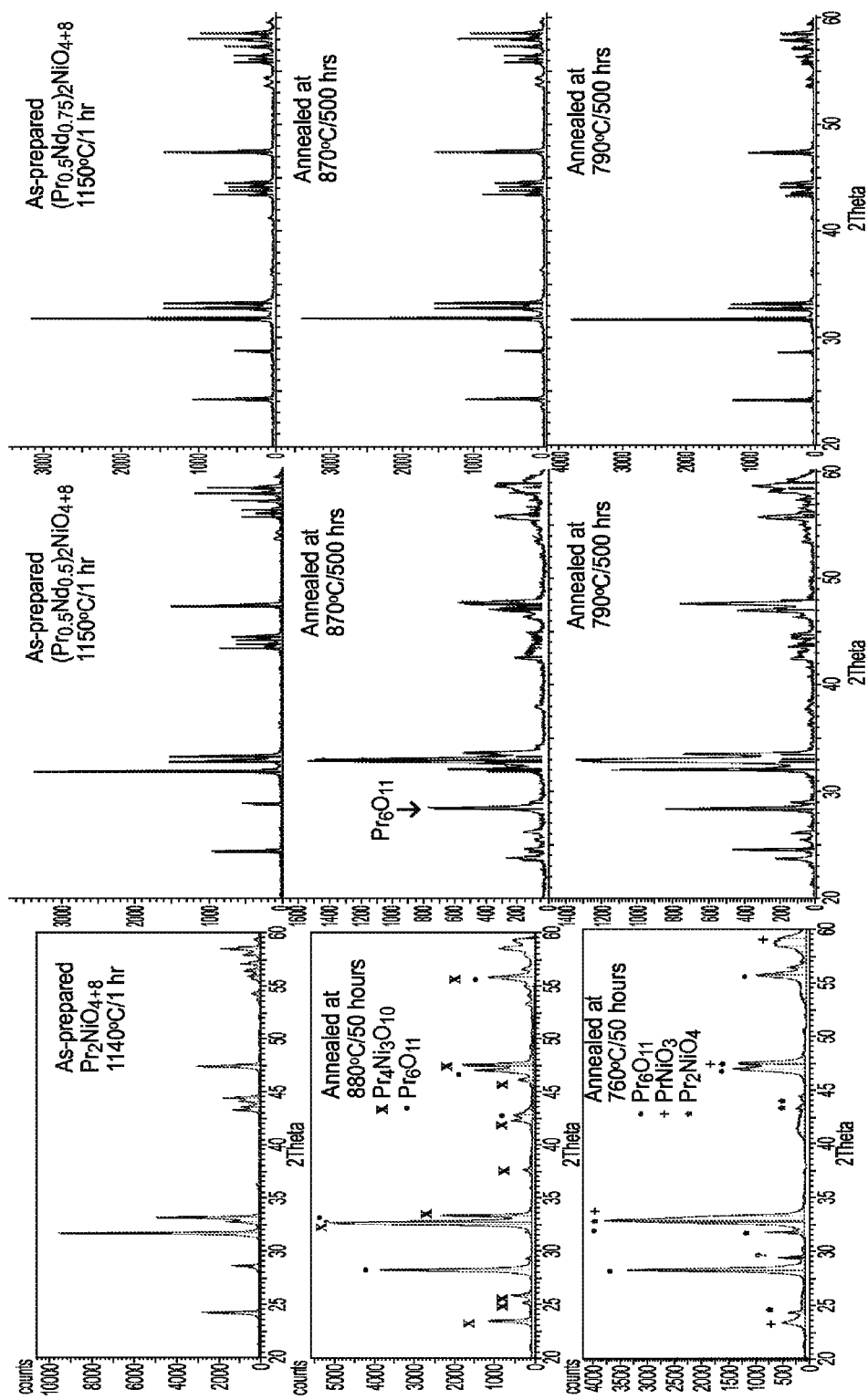
FIGS. 3-7 are plots illustrating results of various experiments carried out on examples of the disclosure.

In one instance, various Pr-nickelate based cathode materials where prepared to evaluated the influence of A-site doping on phase stability. In particular, to stabilize a $Pr_2NiO_{4+\delta}$ phase material, A-site was co-doped with Nd since $Nd_2NiO_{4+\delta}$ exhibited a more stable phase. The doped materials had the formula $(Pr_{0.25}Nd_{0.75})_2NiO_{4+\delta}$ and $(Pr_{0.5}Nd_{0.5})_2NiO_{4+\delta}$. The $(Pr_{0.25}Nd_{0.75})_2NiO_{4+\delta}$ and $(Pr_{0.5}Nd_{0.5})_2NiO_{4+\delta}$ compositions exhibited significant improved phase stability, especially $(Pr_{0.25}Nd_{0.75})_2NiO_{4+\delta}$ composition. FIG. 3 illustrates XRD patterns of $Pr_2NiO_{4+\delta}$, $(Pr_{0.5}Nd_{0.5})_2NiO_{4+\delta}$, and $(Pr_{0.25}Nd_{0.75})_2NiO_{4+\delta}$ before and after annealing at temperature above 750° C. As shown in FIG. 1, after annealing at 790° C. and 870° C. for 500 hrs in air atmosphere, $(Pr_{0.25}Nd_{0.75})_2NiO_{4+\delta}$ pellets showed single phase of $K_2NiF_4$-type structure.

Figure 4:
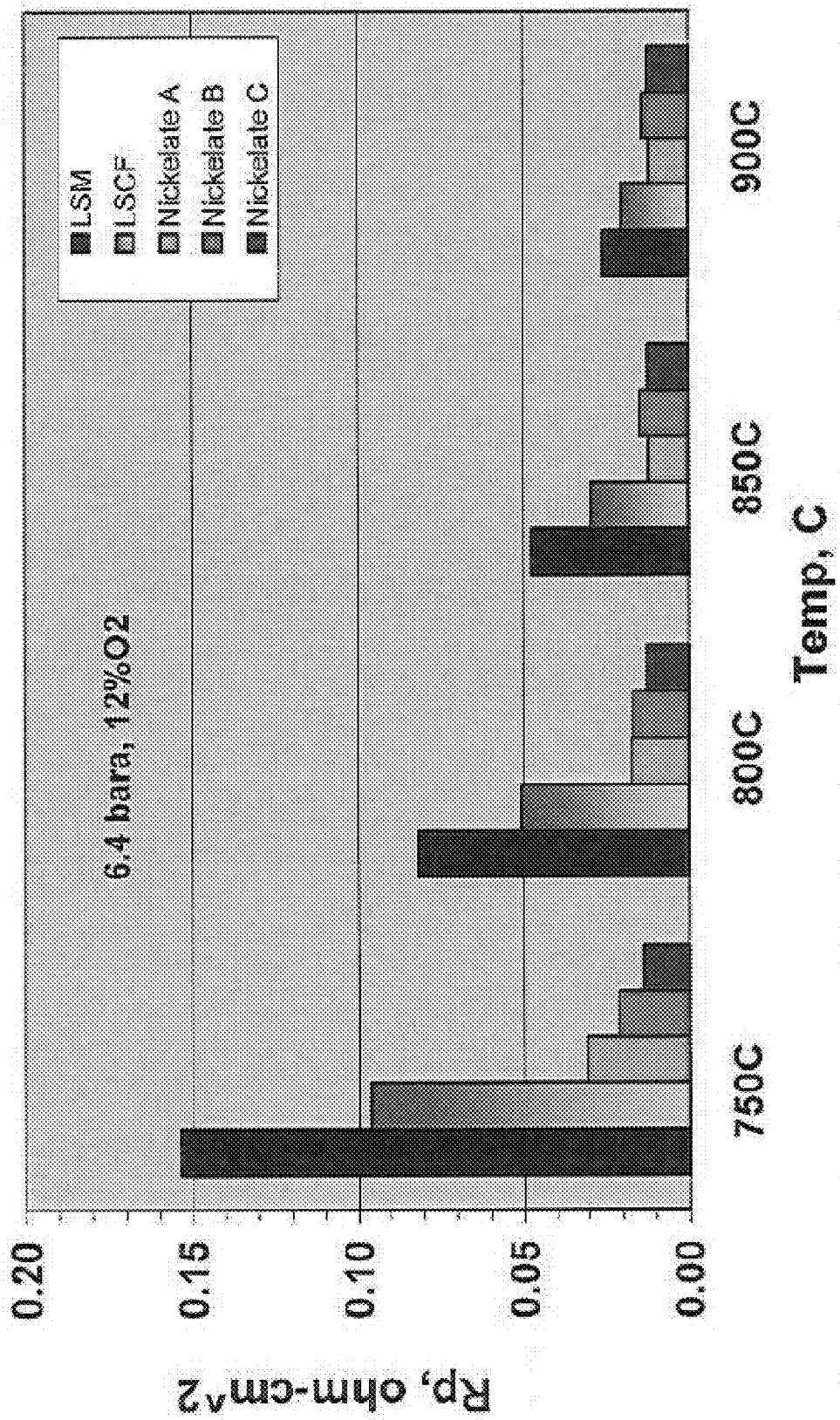

In a second instance, experiments were carried out which showed that both $(Pr_{0.25}Nd_{0.75})_2NiO_{4+\delta}$ and $(Pr_{0.5}Nd_{0.5})_2NiO_{4+\delta}$ compositions have also demonstrated lower ASR than LSM and LSCF. FIG. 4 is a plot of cathode polarization resistances, Rp, versus temperature obtained from various cathodes through symmetrical button cell test using 3YSZ electrolyte. In FIG. 4, nickelates A, B and C are $(Pr_{0.25}Nd_{0.75})_2NiO_{4+\delta}$, $(Pr_{0.5}Nd_{0.5})_2NiO_{4+\delta}$ and $Pr_2NiO_{4+\delta}$, respectively. The results indicated that nickelates A, B, and C have the cathode Rp of <0.014 ohm-cm$^2$ at 850° C., or ≤0.03 ohm-cm2 at 750° C. in 12% $O_2$ under 6.4 bar pressurized atmosphere. Such values are only about one third of LSM-based composite cathode Rp. The low activation energy makes polarization of nickelate cathode less dependent on temperature. After long-term durability test, in post-test analysis by TEM, the nickelate cathode microstructure showed improved phase stability. It can also been seen from FIGS. 3 and 4 that cathode polarization and phase stability decrease with increasing Pr ratio on the A-site.

Figure 5:
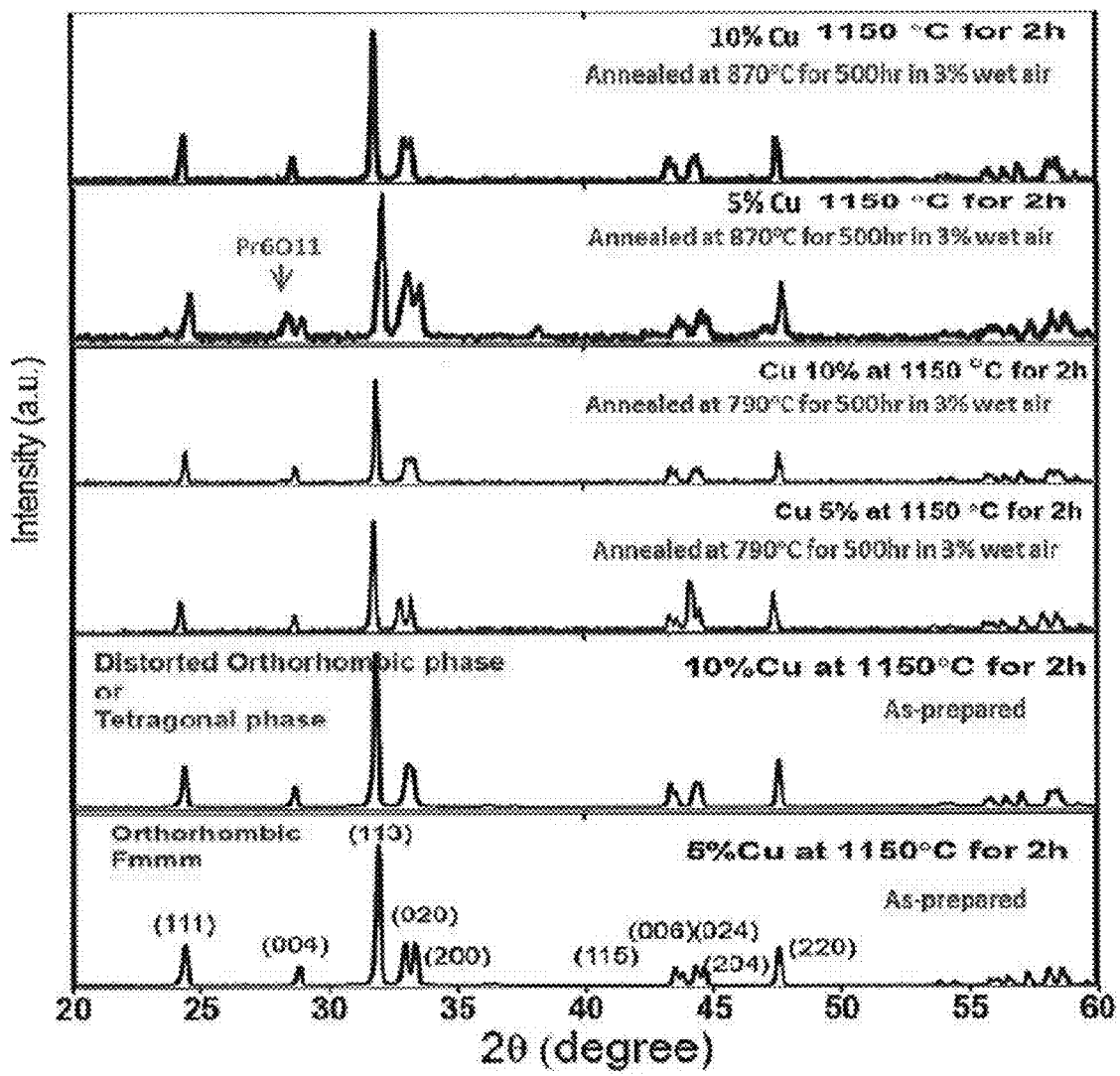

To evaluate the potential lower polarization and increase phase stability during long term operation, new oxide materials with both A-site and B-site doping were investigated to stabilize $Pr_2NiO_{4+\delta}$ phase. The examples used both Nd for A-site dopant and various transition metals (Cu, Co, Mn, Zn, Cr, etc.) for B-site dopant. B-site co-doping with Cu showed the best results in improvement of nickelate long term phase stability. It is believed that nickelate doped with other transition metals in B-site could achieve fully phase stability with further investigation and modification. FIG. 5 illustrates XRD patterns of nickelate materials with both Nd for A-site and Cu for B-site before and after annealing. In particular, FIG. 5 illustrates XRD patterns of $(Pr_{0.5}Nd_{0.5})_2(Ni_{0.95}Cu_{0.05})O_{4+\delta}$, and $(Pr_{0.5}Nd_{0.5})_2(Ni_{0.9}Cu_{0.1})O_{4+\delta}$ before and after annealing at both 790° C. and 870° C. for 500 hrs in 3% wet Air. As shown, 5 mol % and 10 mol % Cu-doped nickelate, $(Pr_{0.5}Nd_{0.5})_2(Ni_{0.95}Cu_{0.05})O_{4+\delta}$, and $(Pr_{0.5}Nd_{0.5})_2(Ni_{0.9}Cu_{0.1})O_{4+\delta}$ exhibited improved phase stability after annealing at 790° C. and 870° C. for 500 hrs in 3% wet air. The electrochemical testing indicated that 5% and 10% Cu doping on B site also benefits electrode polarization reduction. Based on the results, $Pr_2NiO_{4+\delta}$ oxide with A site doping of Nd and B site doping of Cu may be a promising electrode with high performance and phase stability during long term operation for a fuel cell system. In general, based on the results shown in FIG. 5, it is believed that examples of the disclosure may provide for improved cathode materials, including materials with improved phase stability and/or reduced polarization.

Figure 6A:
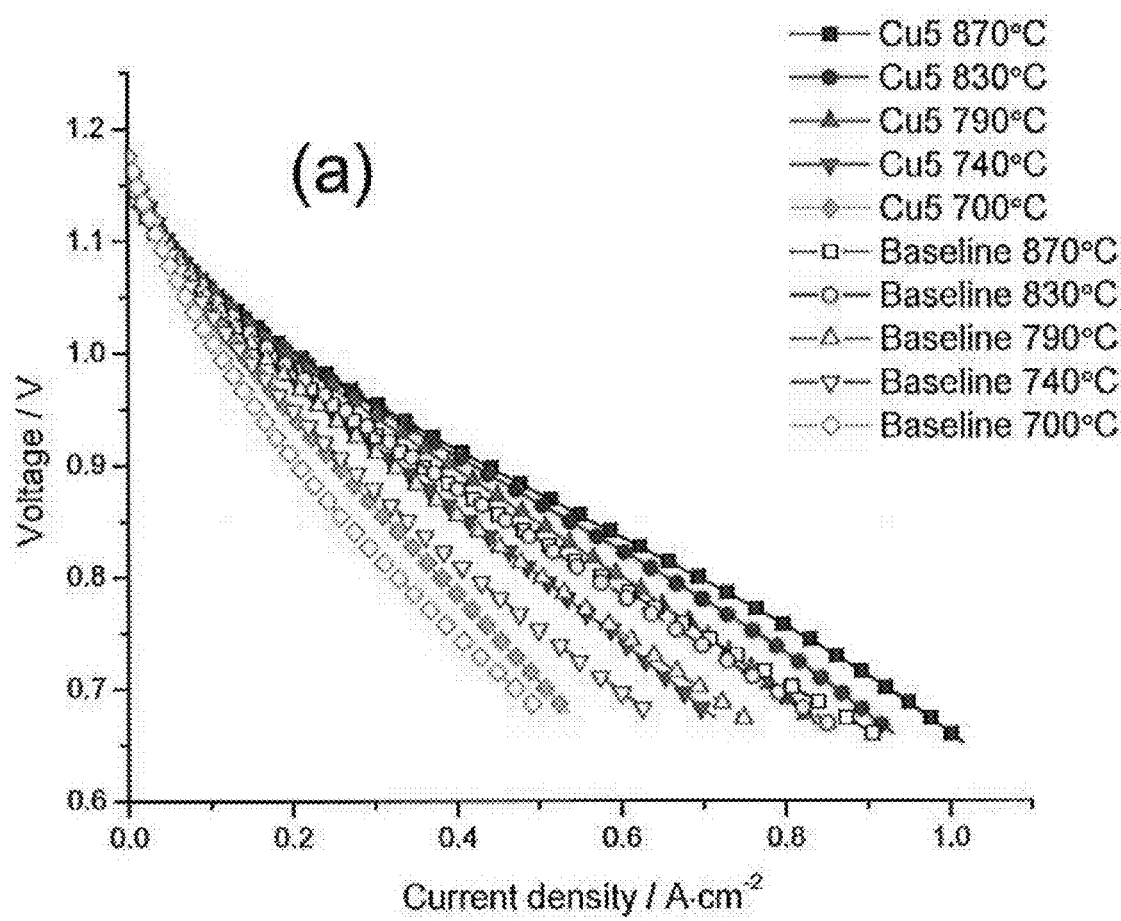
Figure 6B:
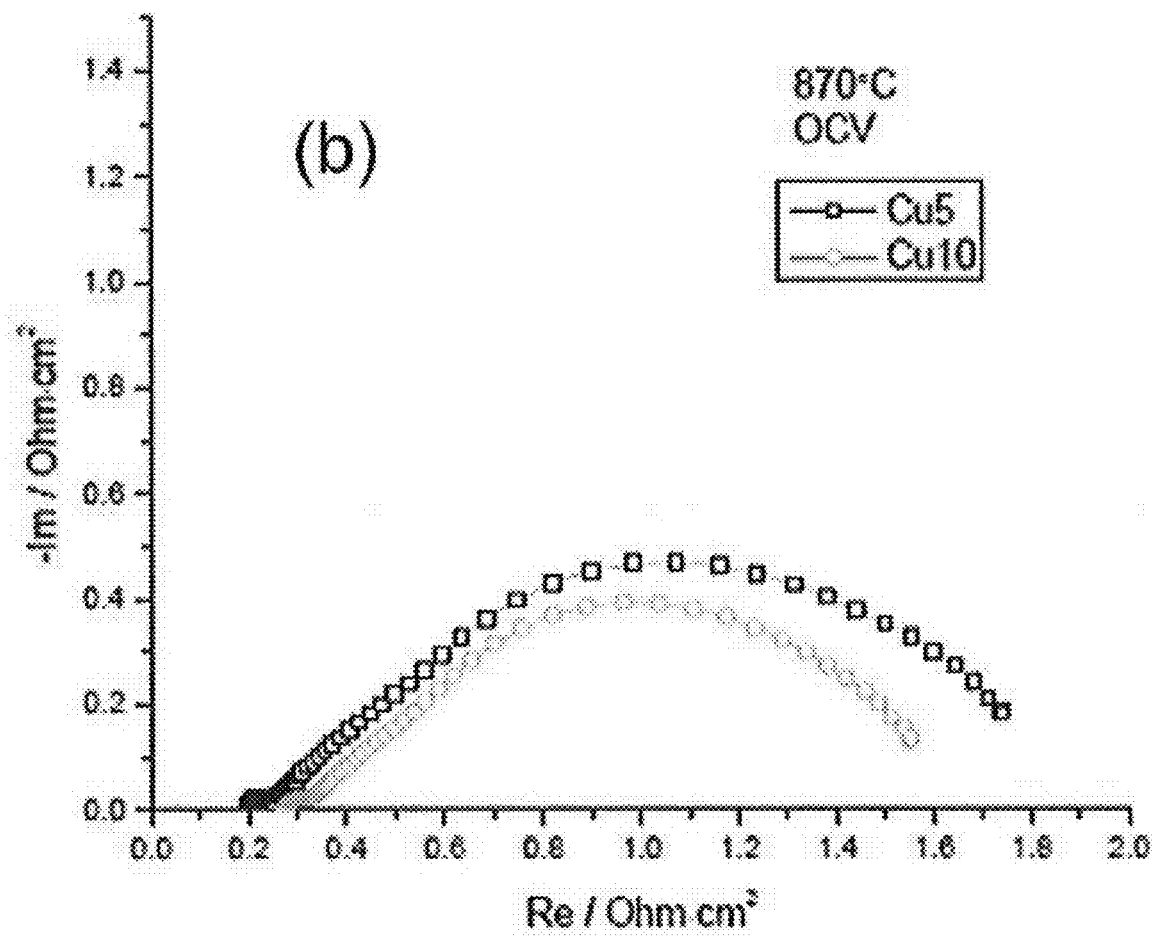

FIG. 6A is a plot of current density versus voltage (I-V curve) of $(Pr_{0.5}Nd_{0.5})_2NiO_{4+\delta}$ with 0 and 5% Cu doping on the B-site. FIG. 6B is a plot an AC impedance curve of $(Pr_{0.5}Nd_{0.5})_2NiO_{4+\delta}$ with 5% and 10% Cu doping on the B-site. These figures illustrate I-V and electrochemical test results for full cells which is employed a doped ceria layer as a cathode barrier on electrolyte and $(LaSr)CoO3-\delta$ layer as a cathode current collect on Pr-nickelate cathode layer, namely, cell structure of anode current collect/anode/electrolyte/doped ceria barrier layer/Pr-nickelate cathode/(LaSr)$CoO_{3-\delta}$ CCC layer. As indicated by the results shown in FIGS. 6A and 6B, the doping on B-site example Pr-nickelate oxides may not only provide phase stability but also at least a degree of performance enhancement.

Figure 7:
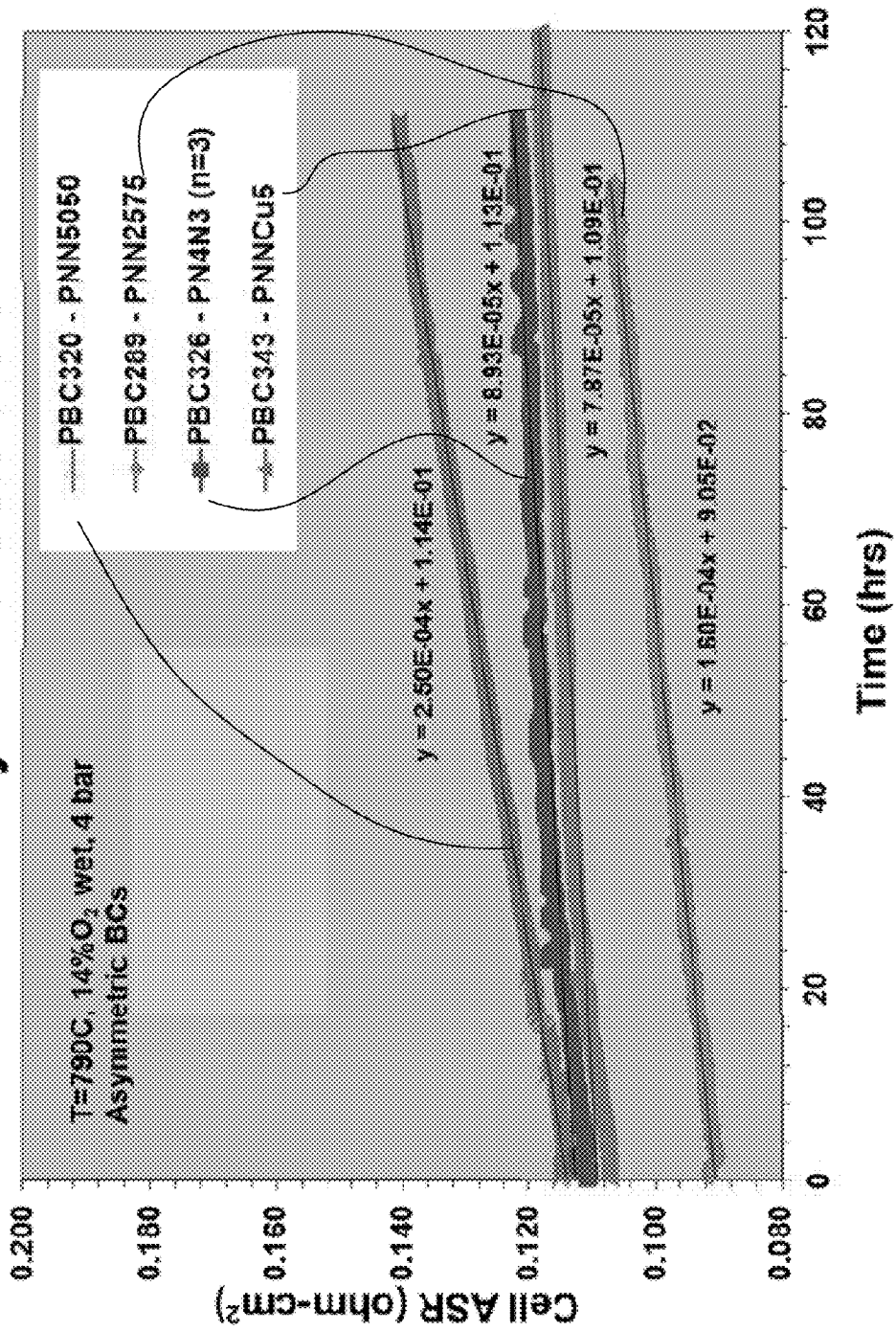

FIG. 7 is a plot illustrating results of a short-term durability test of cathode asymmetric button cells (anodic side has the same material) with different example cathodes: 1) $(Pr_{0.5}Nd_{0.5})_2NiO_{4+d}$ ("PNN5050"), 2) $(Pr_{0.25}Nd_{0.75})_2NiO_{4+d}$ ("PNN2575"), 3) $(Pr_{0.475}Nd_{0.525})_4Ni_3O_{10+d}$ ("PN4N3"), and 4) $(Pr_{0.5}Nd_{0.5})_2(Ni_{0.95}Cu_{0.05})O_{4+d}$ ("PNNCu5"). These button cells included of doped ceria layer as a cathode barrier and $LaNiFeO_{3-d}$ (LNF) layer as a cathode current collector for nickelate cathode. As shown if the plot, it can be seen that cell degradation rate was decreased from ~0.25 ohm-cm²/1000 hrs for PNN5050 nickelate cathode to 0.079 ohm-cm²/1000 hrs for PNNCu5 nickelate cathode. Such results illustrate a reduction in degradation for the PNNCu5 nickelate cathode.

Further Discussion of Aspects of the Disclosure

An oxide of perovskite, $ABO_3$ type structure, LSM-based materials may be used as a cathode for electrochemical cell such as SOFCs operate at high temperature above about 850 degrees C. In SOFCs, the cathode resistance may limit the performance and the long-term durability. Also, because the operation at such a high temperature made many problems, such as high cost interconnects, balance of plant, mechanical and chemical behavior of SOFC components, various cathode materials have been studied with respect to higher performance, long-term durability and lower operation temperature.

For that, nickelate compounds with the Ruddlesden-Popper, or $K_2NiF_4$-type structure, $Ln_2NiO_{4+\delta}$ (Ln=La, Nd, Pr, Sm, etc.), have received attention as these cathodes because of their high mixed ionic and electronic conducting (MIEC) properties. In some case, $Ln_2NiO_{4+\delta}$ cathodes may show enhanced cathode performance and diffusion. $Ln_2NiO_{4+\delta}$ cathodes may exhibit oxide ion diffusion at temperature between 500~800 degrees C. that competitive with the existing perovskite materials. As described above, among the nickelates, $Pr_2NiO_{4+\delta}$ may exhibit the lowest polarization resistance, in some examples.

However, the phase stability and degradation of $Pr_2NiO_{4+\delta}$ materials may be an issue for SOFC cathode application. In some instances, in oxidizing and reducing atmospheres, $Pr_2NiO_{4+\delta}$ may exhibit phase instability at all conditions. High performance degradation rate of fuel cell with $Pr_2NiO_{4+\delta}$ cathode may be affected by phase instability or decomposition of cathode even though it has lower initial polarization resistance than LSM and other cathode candidates. As described herein, a phase stable $Pr_2NiO_{4+\delta}$ cathode with high performance may be achieved through both A-site and B-site doping.

Examples of the disclosure include $Pr_2NiO_{4+\delta}$ cathode compositional ranges for the n=1 R-P in which a relatively high fraction of the A-site is occupied by Pr but in which a B-site dopant is added to improve the phase stability to even higher Pr content than would otherwise be achieved. It is believed that lower ASR may be achieved in some examples with higher Pr, in which the R-P is stabilized through B-site doping. Experimental results for some examples have shown that 5-10% B-site doping with Cu was successful in stabilizing a Pr:Nd ratio of 1:1 although several dopings elements including Co, Zn, Mn, Fe and Cr were also examined and may be suitable.

As apparent from the disclosure, examples of the disclosure include the following:

A fuel cell comprising an anode; an electrolyte; and a cathode separated from the anode by the electrolyte, wherein the cathode includes a Pr-nickelate based material with $(Pr_{1-x}A_x)_{n+1}(Ni_{1-y}B_y)_nO_{3n+1+\delta}$ as a general formula, where n is 1 as an integer, A is an A-site dopant comprising of a metal of a group formed by one or more lanthanides, and B is a B-site dopant comprising of a metal of a group formed by one or more transition metals, wherein the A-site dopant and B-site dopant are provided such that there is an increase in phase-stability and reduction in degradation of the Pr-nickelate based material, and A is at least one metal cation of lanthanides, La, Nd, Sm, or Gd, B is at least one metal cation of transition metals, Cu, Co, Mn, Zn, or Cr, where: $0<x<1$, and $0<y\leq0.4$; and wherein the anode, cathode, and electrolyte are configured to form an electrochemical cell. In some examples, $0.25\leq x\leq0.75$, and $0<y\leq0.2$. In some examples, A is Nd, and B is Cu. In some examples, the $(Pr_{1-x}A_x)_{n+1}(Ni_{1-y}B_y)_nO_{3n+1+\delta}$ exhibits a Ruddlesden-Popper or $K_2NiF_4$ phase constitution.

A fuel cell comprising an anode; an electrolyte; and a cathode separated from the anode by the electrolyte, wherein the cathode includes a Pr-nickelate based material with $(Pr_{1-x}A_x)_{n+1\pm z}(Ni_{1-y}B_y)_nO_{3n+1+\delta}$ as a general formula, where n is 1 as an integer, A is an A-site dopant comprising of a metal of a group formed by one or more lanthanides, and B is a B-site dopant comprising of a metal of a group formed by one or more transition metals, wherein A is at least one metal cation of lanthanides, La, Nd, Sm, or Gd, B is at least one metal cation of transition metals, Cu, Co, Mn, Zn, Fe, or Cr, where: $0<x<1$, $0<y\leq0.4$, and $0<z\leq0.1$; and wherein the anode, cathode, and electrolyte are configured to form an electrochemical cell. In some examples, $0.25\leq x\leq0.75$, $0<y\leq0.2$, and $0<z\leq0.05$. In some examples, A is Nd, and B is Cu. In some examples, the $(Pr_{1-x}A_x)_{n+1\pm z}(Ni_{1-y}B_y)_nO_{3n+1+\delta}$ exhibits a Ruddlesden-Popper or $K_2NiF_4$ phase constitution.

A fuel cell comprising an anode; an electrolyte; and a cathode separated from the anode by the electrolyte, wherein the cathode includes a Pr-nickelate based material with $(Pr_{1-x}A_x)_{n+1\pm z}(Ni_{1-y}B_y)_nO_{3n+1+\delta}$ as a general formula, where n is 2 or 3 as an integer, A is an A-site dopant comprising of a metal of a group formed by one or more lanthanides, and B is a B-site dopant comprising of a metal of a group formed by one or more transition metals, wherein A is at least one metal cation of lanthanides, La, Nd, Sm, or Gd, B is at least one metal cation of transition metals, Cu, Co, Mn, Zn, Fe, or Cr, where: $0<x<1$, $0\leq y\leq0.4$, and $0\leq z\leq0.1$; and wherein the anode, cathode, and electrolyte are configured to form an electrochemical cell. In some examples, $0.25\leq x\leq0.75$, $0\leq y\leq0.2$, and $0\leq z\leq0.05$. In some examples, A is Nd, and B is Cu. In some examples, the $(Pr_{1-x}A_x)_{n+1\pm z}(Ni_{1-y}B_y)_nO_{3n+1+\delta}$ exhibits a Ruddlesden-Popper or $K_2NiF_4$ phase constitution.

A fuel cell comprising an anode; an electrolyte; and a cathode separated from the anode by the electrolyte, wherein the cathode includes a Pr-nickelate based material with $(Pr_{1-x-w}A_xA'_w)_{n+1\pm z}(Ni_{1-y}B_y)_nO_{3n+1+\delta}$ as a general formula, where n is 1 to 3 as an integer, A and A' are an A-site dopant comprising of a metal of a group formed by one or more lanthanides and transition metals, and B is a B-site dopant comprising of a metal of a group formed by one or more transition metals, wherein A is at least one metal cation of lanthanides, La, Nd, Sm, or Gd, A' is at least one metal cation of transition metals, Sr, or Ca, B is at least one metal cation of transition metals, Cu, Co, Mn, Zn, Fe, or Cr, where: $0<x<1$, $0<w<1$, $0<x+w<1$, $0\leq y\leq 0.4$, and $0\leq z\leq 0.1$; and wherein the anode, cathode, and electrolyte are configured to form an electrochemical cell. In some examples, $0.25\leq x\leq 0.75$, $0.1\leq w\leq 0.2$, $0\leq y\leq 0.2$, and $0\leq z\leq 0.05$. In some examples, A is Nd, A' is Ca and/or Sr, and B is Cu. In some examples, the $(Pr_{1-x-w}A_xA'_w)_{n+1\pm z}(Ni_{1-y}B_y)_nO_{3n+1+\delta}$ exhibits a Ruddlesden-Popper or $K_2NiF_4$ phase constitution.

A fuel cell comprising an anode; an electrolyte; and a cathode separated from the anode by the electrolyte, wherein the cathode includes at least one of a $(Pr_{1-x}A_x)_{n+1}(Ni_{1-y}B_y)_nO_{3n+1+\delta}$ material or $(Pr_{1-x-w}A_xA'_w)_{n+1\pm z}(Ni_{1-y}B_y)_nO_{3n+1+\delta}$ material, where A is an A-site dopant and B is a B-site dopant, wherein the A-site dopant and B-site dopant are provided such that there is an increase in phase-stability and reduction in degradation of the at least one of the $(Pr_{1-x}A_x)_{n+1}(Ni_{1-y}B_y)_nO_{3n+1+\delta}$ material or $(Pr_{1-x-w}A_xA'_w)_{n+1\pm z}(Ni_{1-y}B_y)_nO_{3n+1+\delta}$ material, and wherein the anode, cathode, and electrolyte are configured to form an electrochemical cell. In some examples, the at least one of the $(Pr_{1-x}A_x)_{n+1}(Ni_{1-y}B_y)_nO_{3n+1+\delta}$ material or $(Pr_{1-x-w}A_xA'_w)_{n+1\pm z}(Ni_{1-y}B_y)_nO_{3n+1+\delta}$ material comprises the cathode material Pr-nickelate based material described herein.

In some examples, one or more of the example fuel cells further comprising a cathode current collector adjacent the cathode, wherein the cathode current collector comprises a conductive ceramic that is chemically compatible with the cathode material. In some examples, the cathode current collector comprises at least one of a lanthanum nickel ferrite $(La(NiFe)O_{3-\delta})$ or a lanthanum strontium cobaltite $((LaSr)CoO_{3-\delta})$ with a perovskite structure.

In some examples, for one or more of the example cathodes, the A-site dopant consists or consists essentially of the metal of a group formed by one or more lanthanides, and the B-site dopant consists or consists essentially of the metal of a group formed by one or more transition metals.

In some examples, for one or more of the example fuel cells, the cathode consists or consists essentially of the Pr-nickelate based material.

In some examples, for one or more of the example fuel cells, the cathode exhibits a thickness from approximately 3 microns to approximately 30 microns. In some examples, the cathode exhibits a thickness from approximately 5 microns to approximately 10 microns.

In some examples, for one or more of the example fuel cells, the fuel cell is configured as one of a segmented-in-series cell pattern, tubular cell, anode supported planar cell, or electrolyte supported planar cell.

Various embodiments of the invention have been described. These and other embodiments are within the scope of the following claims.

The invention claimed is:

1. A fuel cell comprising:
   an anode;
   an electrolyte; and
   a cathode separated from the anode by the electrolyte, wherein:
   the cathode includes a Pr-nickelate based material with $(Pr_{1-x}A_x)_{n+1}(Ni_{1-y}B_y)_nO_{3n+1+\delta}$ as a general formula, where n is 1 as an integer, A is an A-site dopant comprising Nd, and B is a B-site dopant consisting essentially of Cu, wherein:
      the A-site dopant and B-site dopant are provided such that there is an increase in phase-stability and reduction in degradation of the Pr-nickelate based material, and
      $0<x<1$,
      $0<y\leq 0.4$; and
   the anode, cathode, and electrolyte are configured to form an electrochemical cell.

2. The fuel cell of claim 1, wherein $0.25\leq x\leq 0.75$, and $0<y\leq 0.2$.

3. The fuel cell of claim 1, wherein the $(Pr_{1-x}A_x)_{n+1}(Ni_{1-y}B_y)_nO_{3n+1+\delta}$ exhibits a Ruddlesden-Popper or $K_2NiF_4$ phase constitution.

4. The fuel cell of claim 1, further comprising a cathode current collector adjacent the cathode, wherein the cathode current collector comprises a conductive ceramic that is chemically compatible with the cathode material.

5. The fuel cell of claim 4, wherein the cathode current collector comprises at least one of a lanthanum nickel ferrite $(La(NiFe)O_{3-\delta})$ or a lanthanum strontium cobaltite $((LaSr)CoO_{3-\delta})$ with a perovskite structure.

6. The fuel cell of claim 1, wherein the cathode consists or consists essentially of the Pr-nickelate based material.

7. A fuel cell comprising:
   an anode;
   an electrolyte; and
   a cathode separated from the anode by the electrolyte, wherein:
   the cathode includes a Pr-nickelate based material with $(Pr_{1-x}A_x)_{n+1\pm z}(Ni_{1-y}B_y)O_nO_{3n+1+\delta}$ as a general formula, where n is 1 as an integer, A is an A-site dopant comprising Nd, and B is a B-site dopant consisting essentially of Cu, wherein:
      $0<x<1$,
      $0<y\leq 0.4$,
      $0<z\leq 0.1$; and
   the anode, cathode, and electrolyte are configured to form an electrochemical cell.

8. The fuel cell of claim 7, wherein $0.25\leq x\leq 0.75$, $0<y\leq 0.2$, and $0<z\leq 0.05$.

9. The fuel cell of claim 7, wherein the $(Pr_{1-x}A_x)_{n+1\pm z}(Ni_{1-y}B_y)_nO_{3n+1+\delta}$ exhibits a Ruddlesden-Popper or $K_2NiF_4$ phase constitution.

10. The fuel cell of claim 7, further comprising a cathode current collector adjacent the cathode, wherein the cathode current collector comprises a conductive ceramic that is chemically compatible with the cathode material.

11. The fuel cell of claim 10, wherein the cathode current collector comprises at least one of a lanthanum nickel ferrite $(La(NiFe)O_{3-\delta})$ or a lanthanum strontium cobaltite $((LaSr)CoO_{3-\delta})$ with a perovskite structure.

12. The fuel cell of claim 7, wherein the cathode consists or consists essentially of the Pr-nickelate based material.

13. A fuel cell comprising:
   an anode;
   an electrolyte; and
   a cathode separated from the anode by the electrolyte, wherein:
   the cathode includes a Pr-nickelate based material with $(Pr_{1-x}A_x)_{n+1\pm z}(Ni_{1-y}B_y)_nO_{3n+1+\delta}$ as a general formula, where n is 2 or 3 as an integer, A is an A-site dopant comprising Nd, and B is a B-site dopant consisting essentially of Cu, wherein:

$0<x<1$, $0 \le y \le 0.4$, $0 \le z \le 0.1$; and the anode, cathode, and electrolyte are configured to form an electrochemical cell.

14. The fuel cell of claim 13, wherein $0.25 \le x \le 0.75$, $0 \le y \le 0.2$, and $0 \le z \le 0.05$.

15. The fuel cell of claim 13, wherein the $(Pr_{1-x}A_x)_{n+1 \pm z}(Ni_{1-y}B_y)_nO_{3n+1+\delta}$ exhibits a Ruddlesden-Popper or $K_2NiF_4$ phase constitution.

16. The fuel cell of claim 13, further comprising a cathode current collector adjacent the cathode, wherein the cathode current collector comprises a conductive ceramic that is chemically compatible with the cathode material.

17. The fuel cell of claim 16, wherein the cathode current collector comprises at least one of a lanthanum nickel ferrite ($La(NiFe)O_{3-\delta}$) or a lanthanum strontium cobaltite (($LaSr$)$CoO_{3-\delta}$) with a perovskite structure.

18. The fuel cell of claim 1, wherein $0<\delta<0.3$.

19. The fuel cell of claim 7, wherein $0<\delta<0.3$.

20. The fuel cell of claim 13, wherein $0<\delta<0.3$.

* * * * *